United States Patent [19]

Nowak et al.

[11] Patent Number: 4,525,006
[45] Date of Patent: Jun. 25, 1985

[54] ELECTRICAL DISCONNECT TOOL

[75] Inventors: David J. Nowak, Saint Paul; David F. Zupfer, Stillwater, both of Minn.

[73] Assignee: R.J. LeVesque Manufacturing Co., St. Paul, Minn.

[21] Appl. No.: 490,799

[22] Filed: May 2, 1983

[51] Int. Cl.³ ............................................. A47F 13/06
[52] U.S. Cl. .................................... 294/19.1; 294/106
[58] Field of Search ................. 294/19 R, 106, 16, 88, 294/116; 29/747, 426.1, 271; 81/3.8; 174/138 R

[56] References Cited

U.S. PATENT DOCUMENTS 3,534,993 10/1970 LeVesque, Sr. .
3,627,367 12/1971 Levy .................................. 294/19 R

*Primary Examiner*—James B. Marbert
*Attorney, Agent, or Firm*—Merchant, Gould, Smith, Edell, Welter & Schmidt

[57] ABSTRACT

An electrical disconnect tool (10) for insulatably gripping and removing a high voltage terminator (41) from a connector (43) is disclosed. The terminator (41) has a removal hook (40). The tool (10) includes an elongate tube (14) having first and second ends. A working head (13) is cooperatively connected to the second of the elongate tube. The working head (13) includes a plurality of opposed jaw members (23a) through (23c) for gripping the terminator (41). Means for moving the working head (13) between opened and closed positions is provided. A ratchet assembly (12) is axially spaced from and cooperatively connected to the tube (14). The ratchet assembly (12) includes a ratchet rod (31) with first and second ends. The second end being axially spaced from the working head (13) whereby operation of the ratchet assembly (12) causes the working head (13) to be moved away from the second end of the ratchet rod (31). Also provided is means for engaging the removal hook (40) of the terminator (41). The engaging means is cooperatively connected to the working head (13) and the ratchet assembly (12) is aligned with the engaging means, whereby when the engaging means engages the removal hook (40) of the terminator (41), the second end of the ratchet rod (31) is in a general vertical relationship to the terminator (41).

11 Claims, 6 Drawing Figures

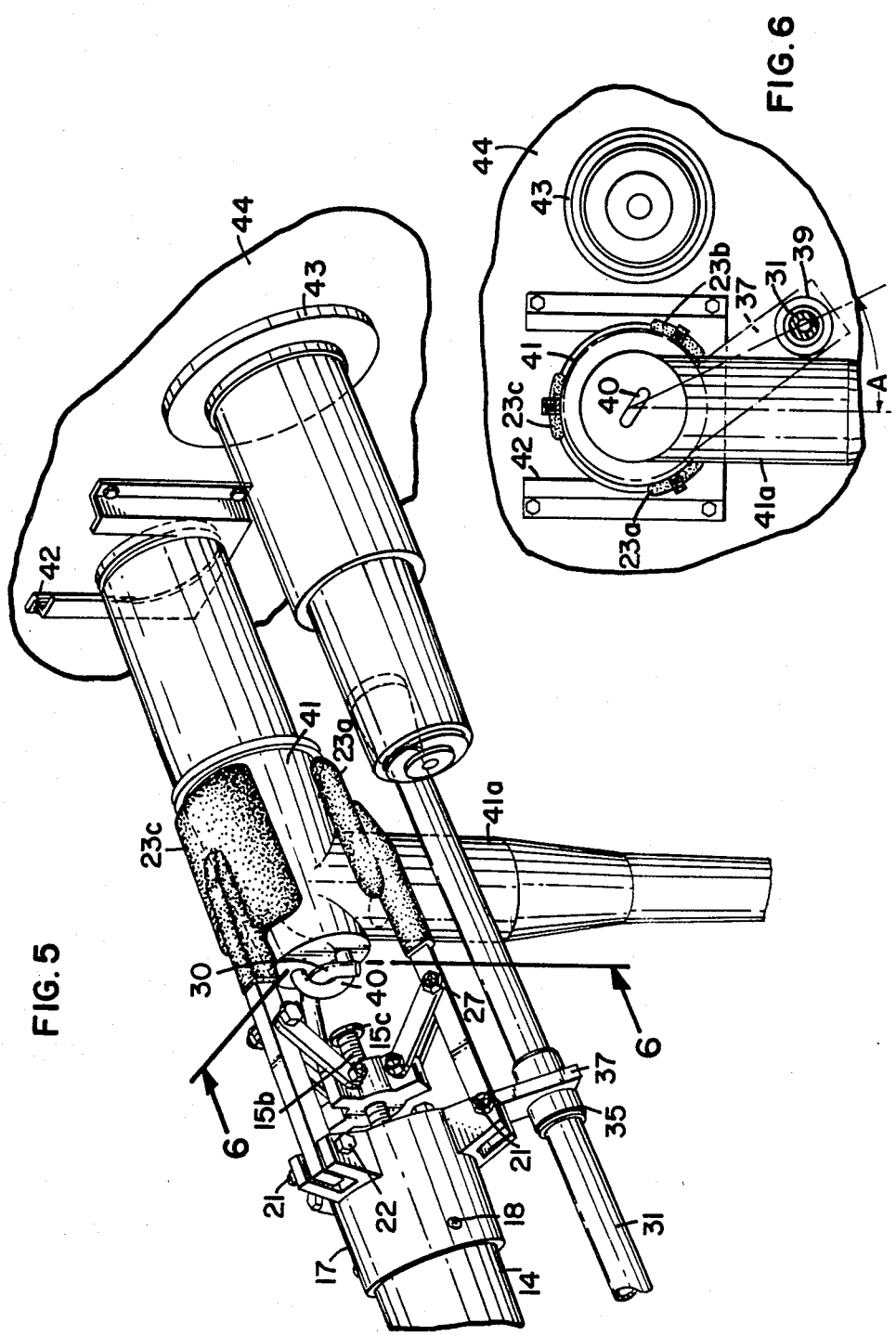

ELECTRICAL DISCONNECT TOOL

BACKGROUND OF THE INVENTION

1. Field of the Invention

This invention relates generally to an electrical disconnect tool and more particularly to an electrical disconnect tool for insulatably gripping and removing a high voltage teriminator from a holder.

2. Description of the Prior Art

High voltage terminator pullers are generally well-known in the art. For example, U.S. Pat. No. 3,534,993, issued Oct. 20, 1970 to Robert J. Levesque, discloses a terminator puller for insulatably removing terminators. The terminator puller includes a longitudinally extending pole having a working head at one end. The working head includes a pair of opposing jaw members for gripping. The working head is operable from the other end of the pole.

The R. J. Levesque Manufacturing Company, the assignee of the previously mentioned patent, has, since the issue of U.S. Pat. No. 3,534,993, made several improvements to the high voltage terminator puller. These improvements included a ratchet assembly that extends along the length of the pole. The operation of the ratchet assembly moves the terminator puller backward, away from the terminator housing, thereby disconnecting the terminator.

In addition, a latching hook is secured proximate the middle of the working head. This latching hook would engage a corresponding hook on the terminator that was to be pulled.

While the improved fuse holder was an advancement over the terminator holder described in U.S. Pat. No. 3,534,993, there were still some deficiencies when the terminator holder was used for specific tasks. This includes the task where terminators were pulled when there was a bank of terminators adjacent one another. When the prior art terminator pullers were used in such situations, the ratchet assembly would rest against the adjacent terminators. This would not allow the working head to properly engage the terminator. In addition, the end of the ratchet member would tend to "walk" as it was being operated. Further, the fasteners on the linking members on the working heads had a tendency to become loose.

The present invention addresses the problems associated with the prior art and provides for an improved electrical disconnect tool that may readily be used when numerous terminators are adjacent each other.

SUMMARY OF THE INVENTION

The present invention provides an electrical disconnect tool for insulatably gripping and removing a high voltage terminator from a connector. The terminators being of the type that have a removal hook. The tool includes an elongated tube having first and second ends. A working head is cooperatively connected to the second end of the tube. The working head includes a plurality of opposed jaw members for gripping the terminator. Means for moving the working head between open and closed positions is provided at the first end of the tube. A ratchet assembly is axially spaced from and cooperatively connected to the tube. The ratchet assembly has a ratchet rod with first and second ends. The second end of the ratchet rod is axially spaced from the working head, whereby operation of the ratchet assembly causes the working head to be moved axially away from the second end of the ratchet rod. Means for engaging the removal hook of the terminator is provided. The engaging means is cooperatively connected to the working head and the ratchet assembly is aligned with the engaging means, whereby when the engaging means engages the removal hook of the terminator, the second end of the ratchet rod is in a general vertical relationship to the terminator.

BRIEF DESCRIPTION OF THE DRAWINGS

FIG. 4 is an enlarged perspective view of the electrical disconnect tool of FIG. 1 showing the ratchet rod and its support;

FIG. 5 is a perspective view of the electrical disconnect tool of FIG. 1 in operation;

FIG. 6 is cross-sectional view taken generally along the lines 6—6 of FIG. 5.

DETAILED DESCRIPTION OF THE INVENTION

Figure 1:
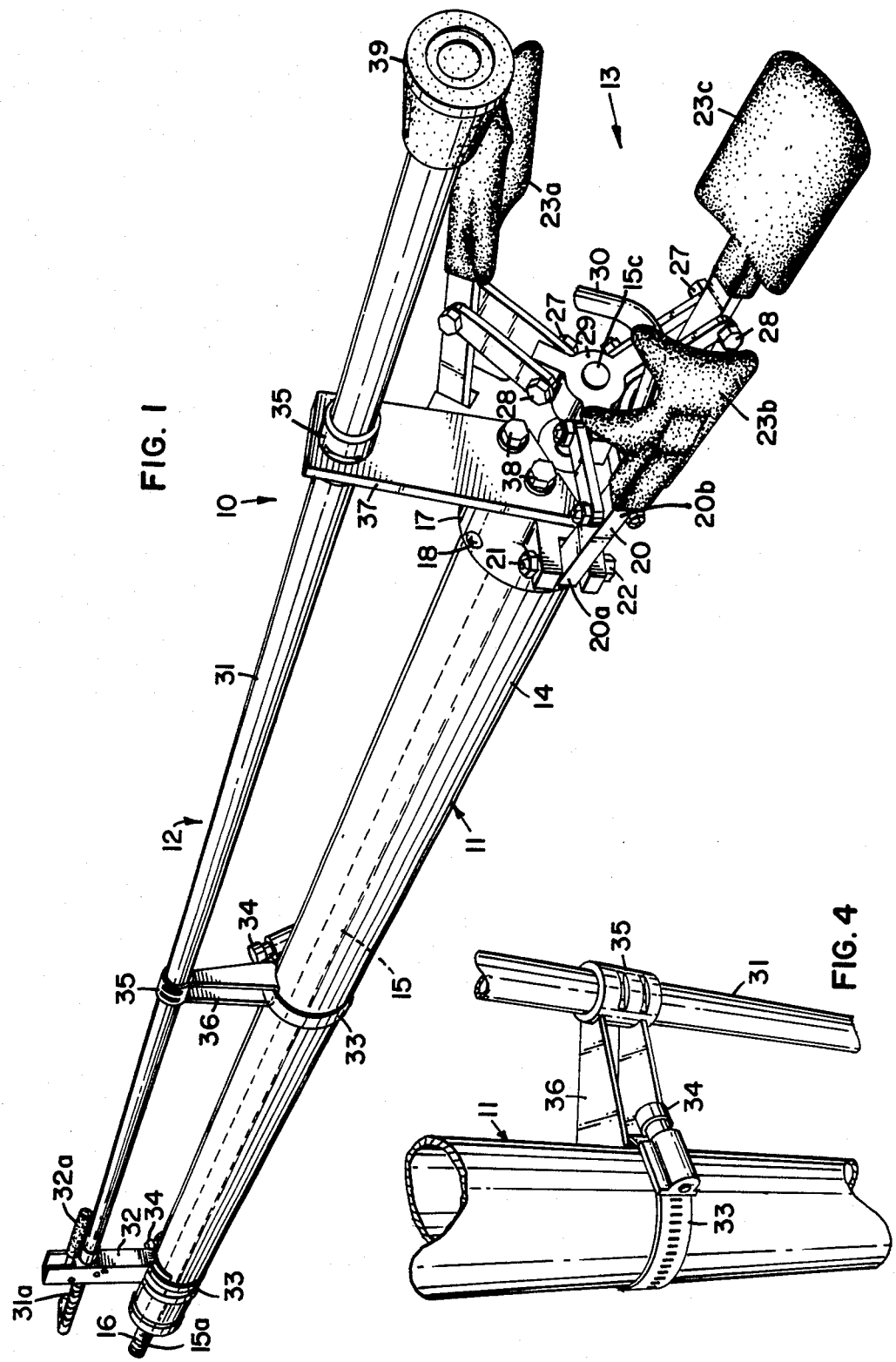
FIG. 1 is perspective view of an electrical disconnect tool according to this invention.
Figure 2:
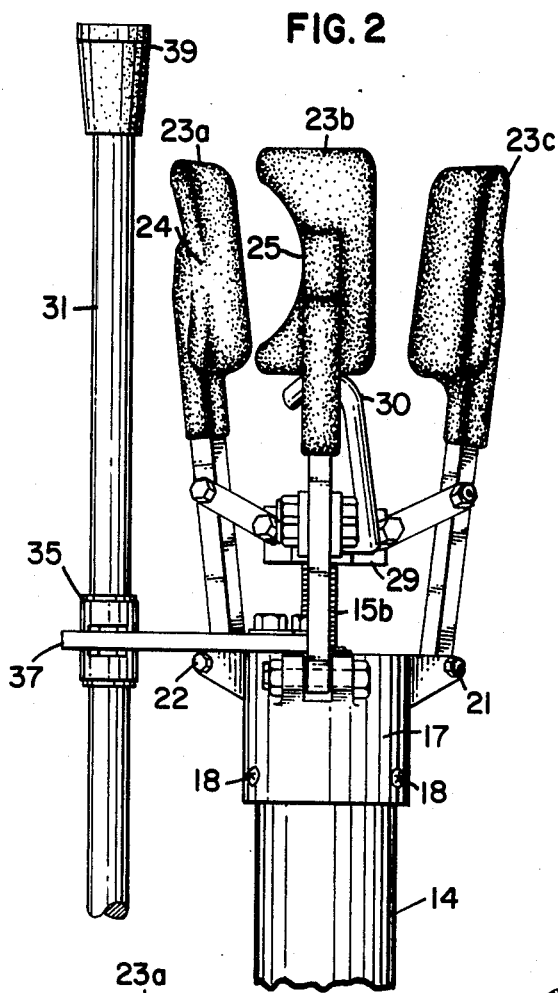
FIG. 2 is a side elevational view of a portion of the electrical disconnect tool of FIG. 1.
Figure 3:
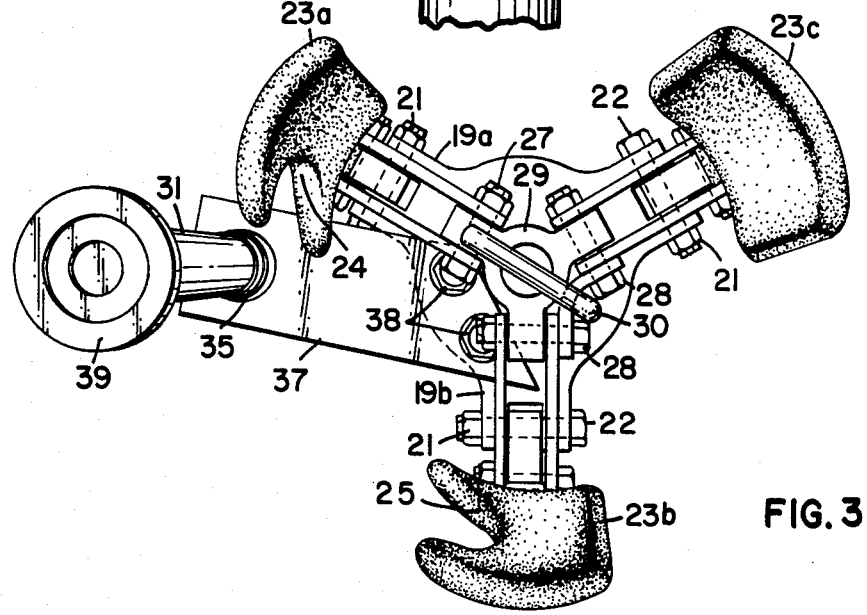
FIG. 3 is a perspective view as generally viewed from the working head end of the electrical disconnect tool of FIG. 1.

Referring to the drawings, wherein like numerals represent like elements throughout the several views, there is generally disclosed as 10 an electrical disconnect tool. The disconnect tool 10 includes three major subassemblies. The first is a pole body, generally designated as 11; the second is a ratchet assembly generally designated as 12; and the third is a working head assembly generally designated as 13.

The pole body 11 includes an elongate tube 14 that may vary in length from 3 to 10 feet and typically is from 4 to 6 feet in length. A shaft 15 having a first end 15a and a second end 15b is carried in the interior of the elongate tube 14. The first end 15a extends beyond the tube 14 and may be covered by a rubber hand grip 16. The second end of the shaft 15b is threaded and is cooperatively connected to the working head 13 as will be more fully described hereinafter. The shaft 15 is adapted to be rotated in the elongate tube 14 by rotation of the grip 16.

The working head 13 includes a collar 17 that is secured to the tube 14 by a plurality of screws 18 around the circumference of the collar 17. The collar 17 has three U-shaped yokes 19a, 19b and 19c. A first bar 20 having a first end 20a and second end 20b has its first end 20a pivotally connected to the yoke 19a by means of a nut 21 and bolt 22. Similarly, second and third bars 20 are pivotally connected to yokes 19b and 19c. Preferably, the nuts 21 are self-locking and are reuseable. In a preferred embodiment, the nut 21 is a hexagonal nut with a nylon insert.

Jaw members 23a, 23b and 23c are cooperatively connected respectively to the second ends 20b to bars 20 which are respectively pivotally connected to yokes 19a, 19b and 19c. Jaw member 23a has an semi-circular notch 24 and jaw member 23b has an semi-circular notch 25. Each of the jaw members 23a, 23b and 23c are arcuate in shape, so that when in the close position, define a circular area. Intermediate the first end 20a and second end 20b of bar 20, a first end of a link 26 is pivotally attached to the bar 20 by means of a nut 27 and bolt 28. The second end of the links 26 are pivotally secured to a member 29 having a threaded opening. The links 26 are pivotally secured to the member 29 by means of nuts 27 and bolts 28. Similar to nut 21 and bolt 22, the nut 27 and bolt 28 are self-locking. The threaded opening of the member 29 is mounted on the threaded second end 15b of the shaft 15. A cap 15c is cooperatively connected to the second end 15b of the shaft 15 to prevent the threaded member 29 from being moved, after assembly, off of the shaft 15. A disconnect hook 30 is cooperatively connected to the member 29.

The ratchet assembly 12 includes a ratchet rod 31 that is axially spaced from the tube 14. A ratchet 32 is secured to the tube 14 by means of a band 33 and screw clamp 34. A ratchet handle 32a is cooperatively attached to the ratchet 32 and operates the movement of the ratchet assembly 12 by simply being moved up and down, thereby causing the sequential engagement of ratchet 32 with grooves 31a on the ratchet rod 31. This advances the ratchet rod 31. The ratchet rod 31 is carried by two nylon bushings 35. One of the bushings 35 is connected to a bracket 36 which is secured to the tube 14 by means of a band 33 and screw clamp 34. The bracket 36 spaces the ratchet rod 31 at least 1.0 inch away from the outer surface of the tube 14. Preferably, the distance between the ratchet rod 31 and tube 14 is greater than 1.5 inches and preferably greater than 1.7 inches. The other bushing 35 is supported by a bracket 37 that is secured to the collar 17 by means of bolts 38. A resilient cap 39 is secured to the end of the ratchet rod 31 proximate the working head. The resilient cap 39 completely covers the end of the ratchet rod 31.

The alignment of the ratchet assembly 12 and the ratchet rod 31 to the alignment of the disconnect hook 30 is critical. When the disconnect hook 30 engages a removal hook 40 of a terminator 41 an angle, designated as "A" in FIG. 6, formed by the ratchet rod 31 and the center of the terminator 41 with a vertical line is less than 45°. Preferably, the angle "A" is less than or equal to 30°. The alignment of the ratchet rod 31 to form an angle "A" and the spacing between the ratchet rod 31 and the tube 14 provide for the disconnect tool 10 to be used in many applications where the prior art disconnect tools were unsatisfactory.

In operation, the electrical disconnect tool 10 is used to remove a terminator 41 from a connector 43. Once removed, the terminator 41 may be placed in a holder 42, which is used to support the terminator 41, although providing no electrical connection, as does the connector 43. The terminator 41 will typically have a cable 41a connected to it. Rotation of the hand grip 16, rotates the shaft 15. The member 29, which is threadably carried by the threaded second end 15b will move up or down along the shaft 15, depending on the rotation of the shaft 15. As the member 29 moves up the shaft 15 towards the cap 15c, the links 26 will pivot, and the jaw members 23a-c will open. Similarly, as the member 29 is carried down the shaft 15, the jaw members 23a-c will close.

To remove a terminator 41 from its connector 43, the jaw members 23a-c are placed in the open position. The disconnect hook 30 engages the removal hook 40 of the terminator 41. The jaw members 23a-c are then closed, clamping the terminator 41. The semi-circular notches 24 and 25, are positioned such that the cable 41a is between the two notches. The ratchet rod 31 is then pushed down until the cap 39 engages the support base 44 on which the connector 43 is mounted. The ratchet handle 32a is then moved up and down causing the ratchet 32 to engage the grooves 31a, thereby moving the pole 14 and the connected working head 13 away from the support base 44, until the terminator 41 is loose. The ratchet rod 31 is then retracted and the terminator 41 may then be removed and manipulated in a normal manner.

The self-locking nuts, that are used wherever there is a pivot, prevent the lossening of the nuts. Because of the pivot action of the members that are secured by the self-locking nuts, in prior art devices, these nuts which were not self-locking, would tend to work loose.

The resilient cap 39 provides a broader base for the push rod 31 to have a friction engagement with the support base 44. This prevents "walking" of the ratchet rod 31 while the ratchet assembly 12 is being operated.

The combination of the alignment of the removal hook 40 and the ratchet rod 31 along with the distance between the ratchet rod 31 and the tube 14 allows for the electrical disconnect tool 10 to be used in places where the prior devices were unuseable. In the prior devices, the ratchet rod 31 would be too close to the tube 14 and at such an angle, that the ratchet rod 31 would hit either the adjacent terminators or holders. This would not provide a good base upon which the ratchet rod 31 could be used to activate the disconnection of the terminator 41. The nylon bushings 35 allow for the ratchet rod 31 to be carried at distance greater than 1 inch from the tube 14 and still not allow the ratchet rod 31 to buckle when operated.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

I claim:

1. An electrical disconnect tool for insulatably gripping and removing a high voltage termination from a connector, the terminator having a removal hook, said tool comprising:
    (a) an elongated tube having first and second ends;
    (b) a working head cooperatively connected to said second end of said elongate tube, said working head comprising a plurality of opposed jaw members for gripping the terminator;
    (c) means for moving said working head between open and closed positions;
    (d) a ratchet assembly axially spaced from and cooperatively connected to said tube, said ratchet asembly having a ratchet rod with first and second ends, said second end being axially spaced from said working head, whereby operation of said ratchet assembly causes said working head to be moved gradually away from said second end of said ratchet rod; and
    (e) means for engaging the removal hook of the terminator, said engaging means cooperatively connected to said working head and said ratchet assembly is aligned with said engaging means, whereby when said engaging means engages the removal hook of the terminator, said second end of said ratchet rod is in a general vertical relationship to the terminator.

2. The tool of claim 1, further comprising a cap cooperatively connected to said second end of said ratchet rod, whereby when said ratchet assembly is operated, said cap reduces movement of said ratchet rod.

3. The tool of claim 1, wherein said ratchet rod is carried by a plurality of nylon bushings, said bushings being axially spaced from said tube.

4. The tool of claim 1, wherein said working head comprises:
   (a) a connecting member; and
   (b) a first, second and third gripping members pivotally connected to said connecting member;

5. The tool of claim 4, wherein said engaging means comprises a hook cooperatively connected to said connecting member.

6. The tool of claim 1, wherein said ratchet rod is greater than 1.0 inches from said tube.

7. The tool of claim 1, wherein an angle formed by said ratchet rod and the center of the terminator with a vertical line is less than 45°.

8. The tool of claim 7, wherein said angle is less than or equal to 30°.

9. An electrical disconnect tool for insulatably gripping and removing a high voltage terminator from a connector, the terminator having a removal hook, said tool comprising:
   (a) an elongated tube having first and second ends;
   (b) a working head cooperatively connected to said second end of said elongate tube, said working head comprising a plurality of opposed jaw members for gripping the terminator, a connecting member, and a first, second and third gripping member pivotally connected to said connecting member, said pivotal connections being secured by self locking nuts and bolts;
   (c) means for moving said working head between open and closed positions;
   (d) a ratchet assembly axially spaced greater than 1.0 inches from and cooperatively connected to said tube, said ratchet assembly having a ratchet rod with first and second ends, said second end being axially spaced from said working head, whereby operation of said ratchet assembly causes said working head to be moved gradually away from said second end of said ratchet rod;
   (e) a cap cooperatively connected to said second end of said ratchet rod; and
   (f) a disconnect hook for engaging the removal hook of the terminator, said disconnect hook cooperatively connect to said connecting member and said ratchet assembly is aligned with said removal hook, whereby when said disconnect hook engages the removal hook of the terminator, an angle formed by said ratchet rod and the center of the terminator with a vertical line is less than 45°.

10. The tool of claim 9, wherein said ratchet rod is carried by a plurality of nylon bushings, said bushings being axially spaced from said tube.

11. The tool of claim 9, wherein said angle is less than or equal to 30°.

* * * * *